J. E. SHEUMAN.
FLOATING REAMER AND TAP HOLDER.
APPLICATION FILED NOV. 18, 1916.
1,244,648. Patented Oct. 30, 1917.
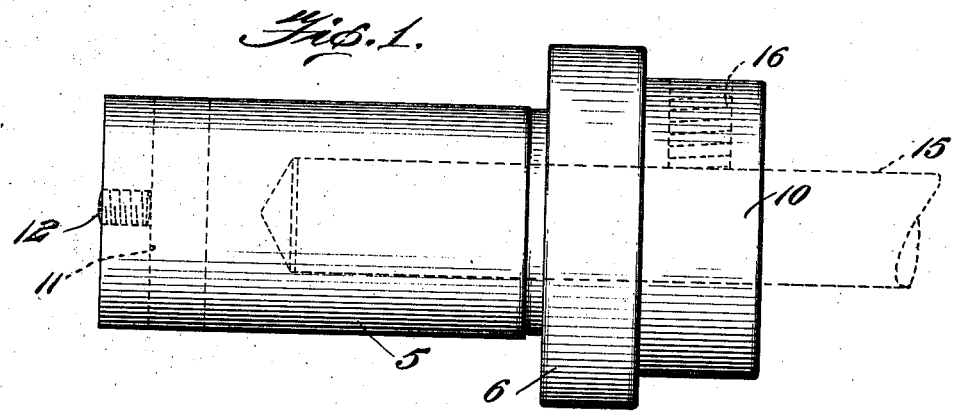
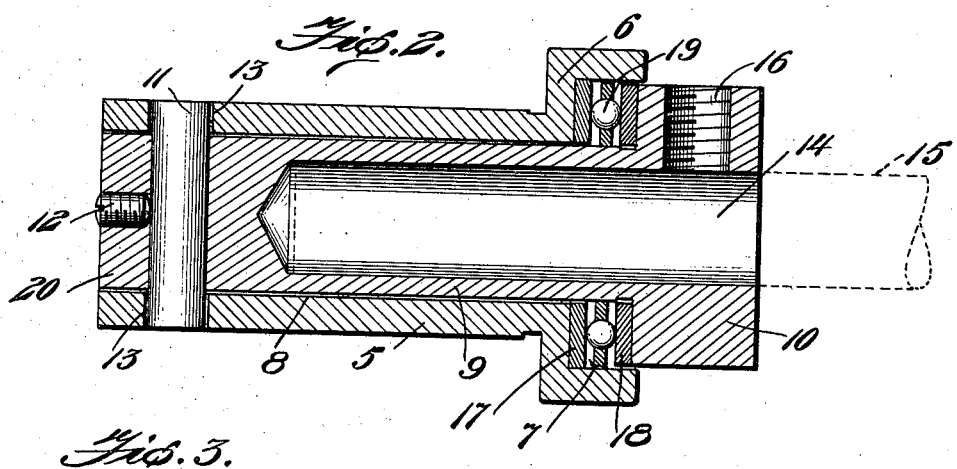
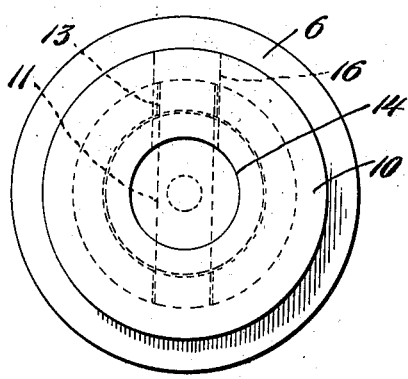
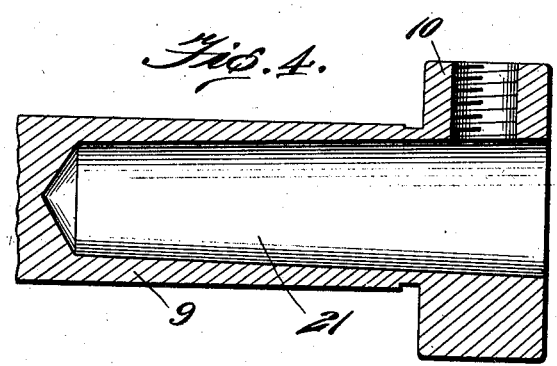

UNITED STATES PATENT OFFICE.

JAMES E. SHEUMAN, OF WAYNESBORO, PENNSYLVANIA.

FLOATING REAMER AND TAP HOLDER.

1,244,648.

Specification of Letters Patent.  Patented Oct. 30, 1917.

Application filed November 18, 1916. Serial No. 132,130.

*To all whom it may concern:*

Be it known that I, JAMES E. SHEUMAN, a citizen of the United States, residing at Waynesboro, Franklin county, and State of Pennsylvania, have invented and discovered certain new and useful Improvements in Floating Reamer and Tap Holders, of which the following is a specification.

My said invention relates to tool holders for turret lathes and screw-threading machines and consists in the combinations and arrangements of elements hereinafter described and particularly set forth in the accompanying claims.

The invention has for its purpose to provide a floating reamer and tap holder that will automatically compensate or allow for all deficiencies in alinement of the turret and spindle of turret lathes or automatic screw machines, and without in any way interfering with the manner of working or efficiency of such machines.

A further purpose of the invention is to provide a tool holder of this character having a sensitive thrust bearing which will properly position the cutting tool when brought into contact with the work, thereby assuring that the piece will be reamed, or screw-threaded, to the size of the tool and with uniformity throughout.

The invention is shown by way of illustration in the accompanying drawing, wherein—

Figure 1 is a side elevational view thereof,

Fig. 2 a longitudinal section through the same,

Fig. 3 a front end elevation, and

Fig. 4 a longitudinal section of a modified form of tool carrying member.

Referring to the construction in further detail, and wherein like reference characters designate corresponding parts, the device consists of a bushing 5 having at one end a head 6 providing a recess 7 that is formed continuous with the bore 8 running the length of the bushing; and said bushing is adapted to be fitted and secured to the turret of the lathe, or other machine, in any suitable manner.

A tool holder, comprising a shank 9 having a head 10, fits within the bore 8 of the bushing and is of slightly less diameter than said bore, whereby the shank may have limited play or movement for centering the head 10 that carries the tool when said tool is brought into engagement with the work. The shank 9 is bored transversely adjacent its rear end to receive the key or pin 11 that is secured thereto by the screw 12, and the respective end portions of said pin are fitted to have slight movement within the alined apertures 13 formed in the bushing 5, as shown in Fig. 2.

The tool carrying member is centrally bored, as at 14, to receive the cutter holder or tool 15, and a threaded opening 16 is formed in the head 10 for the usual locking screw.

The head 10 is of slightly less diameter than the diameter of the recess 7 and fits partly within said recess, as shown in Fig. 2; and an appropriate ball thrust bearing such as the Bantam thrust ball-bearing shown is located within said recess between the head 6 of the bushing and the head 10 of the tool carrying member.

The ball thrust bearing has for its purpose to automatically position the cutting tool when brought into contact with the work and thereby assure that the piece will be reamed, or screw-threaded, to the size of the tool, and also to relieve the shank 9 from such strains as would occur where there is no relative movement between the shank of the tool holder and the bushing.

Said thrust bearing comprises a pair of hardened steel washers 17 and 18, having a plurality of anti-friction balls 19 therebetween and located to take up and distribute the thrust equally about the head 6 of the bushing. The washer 18 is of slightly less diameter than the washer 17 to allow of slight angular movement of the head and permit the rear end 20 of the shank to have limited freedom of movement within the bore 8 of the bushing 5.

The construction of tool carrying member shown in Fig. 4 is the same as that disclosed in Figs. 1 and 2, excepting that the bore 21 is formed as a tapering socket to receive the tool piece with a wedge action after the well-known manner.

It is obvious that those skilled in the art may vary the details of construction and arrangement of parts without materially departing from the spirit of my invention, and I therefore do not wish to be limited to such features except as may be required by the claims.

Having thus fully described my said in- vention, what I claim as new and desire to secure by Letters Patent, is:

1. A tool holder comprising a bushing having a longitudinal aperture and a recessed head surrounding the outer end of said aperture, a tool carrying member mounted loosely within said bushing and connected to rotate therewith to have a limited independent movement, said tool carrying member being formed with a head adapted to fit within the head of the bushing, and a ball thrust bearing interposed between the adjacent faces of the recess in the bushing and the head of the tool carrying member, substantially as set forth.

2. A tool holder comprising a bushing having a recessed head, a tool carrying member having a shank loosely fitting in said bushing and having a head fitting in the recess of the head thereof, a loose connection between the shank of the tool holder and the bushing, and a sensitive thrust bearing interposed between said heads providing a floating mount for the tool holder, substantially as set forth.

3. A tool holder comprising a bushing having a recessed head, a tool carrying member having a shank loosely fitting in said bushing and having a head fitting in the recess of the head thereof, and a sensitive thrust bearing comprising a pair of washers with balls interposed therebetween located between said heads and providing a floating mount for the tool holder, substantially as set forth.

4. A tool holder comprising a bushing having a recessed head, a tool carrying member having a shank of less diameter than the bore of the bushing and a head of less diameter than the recess in the head of the bushing and fitting loosely therein, a pin carried by said shank having loose engagement with said bushing, and a sensitive thrust bearing interposed between the head of said bushing and the head of the tool holder and providing a floating mount for said tool holder, substantially as set forth.

5. A tool holder comprising a bushing having a recessed head, a tool carrying member having a shank of less diameter than the bore of the bushing and loosely fitting therein, said tool holder having a head fitting loosely in the recess of the bushing head, a pin secured to said shank and having loose engagement with the bushing, and a thrust bearing comprising a pair of washers with anti-friction balls therebetween located within the recess of the bushing head and providing a floating mount for the tool holder, substantially as set forth.

6. A tool holder comprising a bushing having a recessed head, a tool carrying member having a shank of less diameter than the bore of the bushing and loosely fitting therein, said tool holder having a head fitting loosely in the recess of said bushing head, a pin secured to said shank having loose engagement with said bushing, and a sensitive thrust bearing providing a floating mount for the tool holder comprising a pair of washers of relatively different diameters with anti-friction balls therebetween located in the recess of the bushing head, substantially as set forth.

In witness whereof, I have hereunto set my hand and seal at Waynesboro, Pennsylvania, this 9th day of November, A. D. nineteen hundred and sixteen.

JAMES E. SHEUMAN. [L. S.]

Witnesses:
H. MILTON BENEDICT,
CHAS. W. CREMER.